United States Patent [19]
Tanaka

[11] 3,721,495
[45] March 20, 1973

[54] CONTROL APPARATUS FOR FILM TRAVEL ACTUATED BY PICTURE FRAME EDGE SIGNALS

[75] Inventor: Atsuyuki Tanaka, Osaka, Japan

[73] Assignee: Minolta Camera Kabushiki Kaisha, Osaka, Japan

[22] Filed: June 9, 1970

[21] Appl. No.: 44,730

[52] U.S. Cl. .................... 355/41, 355/97, 355/109
[51] Int. Cl. ............................................. G03b 27/46
[58] Field of Search .................. 355/41, 97, 109, 111

[56] References Cited

UNITED STATES PATENTS

| | | | |
|---|---|---|---|
| 2,209,342 | 7/1940 | Loughridge et al. | 355/41 |
| 2,580,270 | 12/1951 | Badgley et al. | 355/41 X |
| 2,594,358 | 4/1952 | Shaw | 355/41 |

Primary Examiner—Samuel S. Matthews
Assistant Examiner—E. M. Bero
Attorney—Watson, Cole, Grindle & Watson

[57] ABSTRACT

This invention relates to a control apparatus for film travel, actuated by picture frame edge signals, which apparatus controls the travel of a roll of film having no perforations, on which a number of picture images are successively disposed, in order to print in sequence each picture image on said film, which apparatus controls the travel of the film by operating a film stop device by means of signals from a detection device for detecting the rapid change of the density at the fore edge and the aft edge of the picture image frame, and which, when its discriminator cannot detect the above signals or does not accept the signal detected as a correct picture frame edge signal, controls the travel of the film by means of another edge signal.

9 Claims, 4 Drawing Figures

CONTROL APPARATUS FOR FILM TRAVEL ACTIVATED BY PICTURE FRAME EDGE SIGNALS

BACKGROUND OF THE INVENTION

In a film on which a plurality of picture images can be disposed successively, but which is not provided with perforations thereon such as in a roll of 120 film, each space between picture frames is not always constant, and the frames of successive picture images are almost equal in length on the same film, but not always equal in length on different films. This U.S. Pat. No. 3,671,123 relates to a printing device which is able to make accurate copies of picture images by optically detecting each picture frame edge of each picture image and controlling the film transfer by comparing it with a standard.

However, the optical detection of picture frame edges involves such disadvantages as the optically detecting device malfunctions frequently due to the character of the picture images, the properties of the picture frame edges, scratches in the spaces between picture frames, and the like.

SUMMARY OF THE INVENTION

The present invention relates to a film travel control apparatus which is intended to resolve the aforementioned defects by means of providing a device comprising a picture frame edge detecting device and associated recording devices, a record inspecting device and a discriminator, wherein the discriminator determines the trueness of the recording signals, identifying them based on signals from the picture frame edge detecting device for both the fore and aft edges of each picture frame, as well as with respect to the tolerance of the picture frame length and the distance between each picture frame.

The first object of the present invention is to provide a film travel control apparatus which detects both the fore and aft picture frame edges of a number of picture images to be formed on a film with irregular spacing between the picture frames as well as unequal lengths of the picture frames, whereby each picture frame edge signal is properly checked by discriminator.

The second object of the present invention is to provide a film travel control apparatus, wherein signals for both the fore and aft edges of picture frames are detected by a picture frame edge detecting device, and the picture frame edges are discriminated from specks and bruises in the picture image itself and/or on the film of each space between picture frames.

The third object of the invention is to provide a film travel control apparatus, wherein a discriminator determines the correct picture frame edges according to signals of a picture frame edge detecting device, by determining whether they correspond to the fore and aft edges of picture frames or not.

The fourth object of the invention is to provide a film travel control apparatus, wherein the apparatus determines the correct picture frame signals by checking signals corresponding to the fore and aft edges of a picture frame and substituting signals detected by the picture frame edges of the preceding picture frame.

The above and further objects of this invention will be better understood from the detailed description taken in conjunction with the accompanying drawings.

DESCRIPTION OF THE PREFERRED EMBODIMENT

Figure 1:
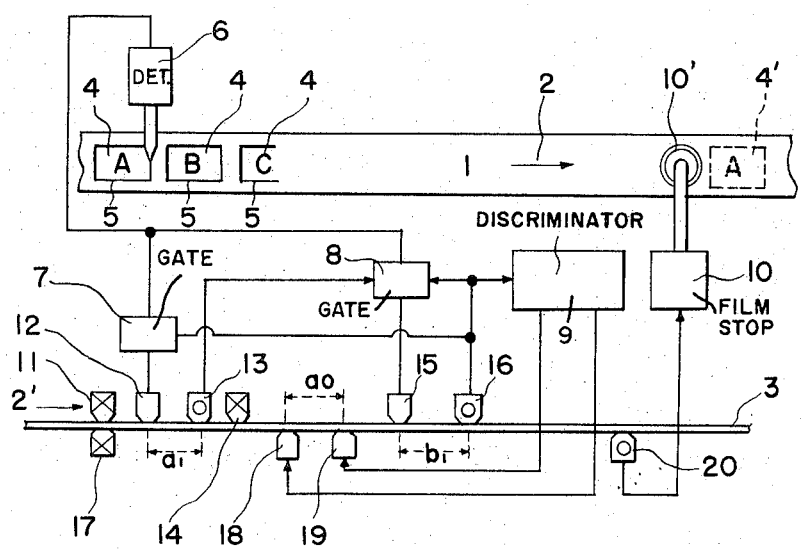
FIG. 1 is a block diagram of the first embodiment of the present invention.

Referring to FIG. 1 to describe the first embodiment of the present invention, a film 1 having a plurality of picture images disposed successively thereon in a series of picture frames is transferred in the direction of arrow 2 by any transfer device (not shown). The picture image of this film is generally formed by photographing an object (a document, for example) placed on a white board having black borders, in which said picture image is enclosed to form its picture frame, of predetermined density, and the density between picture frames is comparatively low.

A magnetic tape 3 is also transferred in the direction of arrow 2', in synchronization with the film 1.

Figure 2:
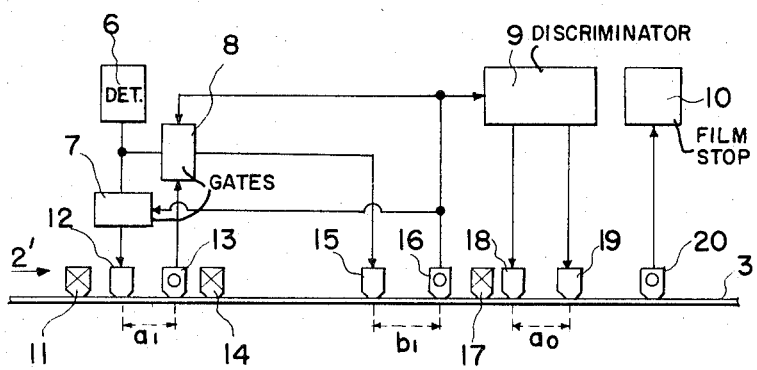
FIG. 2 is a block diagram of the second embodiment of the invention.

The magnetic tape 3 has a number of heads 11 through 2 mounted in operative relationship therewith wherein the heads 12, 15, 18 and 19 having no mark therein are the recording heads, the heads 13, 16, 20 marked with 0 are the record reading heads, and the heads 11, 14 and 17 marked with X are the erasing heads. Although a group of heads 11 through 16 and another group of heads 18 through 20 are disposed respectively on the front and the rear surfaces of the tape 3 in the drawing, all heads of both groups can be juxtaposed on the identical face of the tape 3, as shown in FIG. 2 for a more convenient arrangement.

The film 1 includes a picture frame edge detecting device 6 and a film stop device 10' spaced apart from each other, wherein picture frame edge detecting device 6 detects each picture frame edge which is a boundary between a space between each picture frame and a picture image on the transported film 1, by means of, e.g., an illuminating light source and a photo-electric conversion element.

The film stop device 10' comprising an electromagnet positioned on one side of the film 1 and a steel piece facing thereto and closely located on the other side of the film 1, stops the film 1, when the electromagnet is excited, by gripping it between the electromagnet and the steel piece.

Assuming now that the front edge of one picture frame A is detected by the picture frame edge detecting device 6, its detected signal is transmitted to the recording heads 12 and 15 via the gates 7 and 8 respectively, and recorded on the tape 3 at two positions thereon, when the gates 7, 8 have been opened, the signal recorded by the head 12 being inspected by the reading head 13 thereafter.

The distance between heads 12 and 13 is substantially equal to the minimum value $a_1$ of the standard size of one picture frame. The signal inspected by the head 13 reopens the gate 8 which has been temporarily closed by the passage of the detecting aforementioned signal, is erased by an erasing head 14. The reason why, in addition to a recording head 15, a recording head 12 is provided, in the embodiment of the present invention, is as follows. In order to record by means of said head 15 the aft edge signal of the first picture frame, it is necessary to leave gate 8 opened when it passes through the picture frame edge signal from detecting device 6. Accordingly head 13 must read the fore edge signal recorded by head 12 and gate 8 is opened. With regard to the second edge and other edges coming after said edge in order, therefore, heads 12, 13 and 14 become actually unnecessary, since gate 8 is opened by means of the reading signal of a reading head 16 as described hereinafter. Immediately after gate 8 is reopened, the aft edge of a picture frame A passes the picture frame edge detecting device 6, thereby its signal transmitted to a recording head 15 through the gate 8 is recorded on the tape 3.

Consequently two signals for the fore edge and the aft edge of the picture frame A are recorded onto the tape 3 from head 15, spaced apart the length of the picture frame A.

A reading head 16 is is provided at a distance which is equal to the minimum picture frame distance $b_1$, that is, the distance from the fore edge of picture frame B to the fore edge of picture frame A, for example, or a little shorter distance, in the direction of the arrow 2' from head 15.

Head 16 is the first to inspect the fore edge record of the picture frame A, then inspects the aft edge record of the picture frame A, transmitting the respective inspected signals to a discriminator 9 and the gate 8. When the signal for the fore edge of the picture frame is checked by the discriminator to correspond to the signal of the correct fore edge, that signal is transmitted to the head 18 and recorded in another line on the recording tape 3, and the discriminator 9 closes a gate through which the aft edge signal, as described hereafter, by head 16 is sent to recording head 19. But if the signal corresponding to the fore edge of the picture frame is determined to be unusual, that signal is stopped by the discriminator 9, and after being held until the signal for the aft edge of the picture frame A is inspected by the head 16, it is recorded in another line on the recording tape 3.

Further, the distance between the recording heads 18 and 19 is so arranged as to coincide with the average value $a_0$ of one picture frame length, thereby the signal recorded by the head 19 is recorded at a position which coincides with the position to which the signal for the fore edge of the picture frame should be recorded by the head 18, substituting the signal of the fore edge of the picture frame A which was not recorded thereon due to its being faulty.

The signal thus recorded is inspected by a reading head 20. The position where said reading head 20 is disposed, when the signal recorded by head 18 or head 19 reaches said head 20, is set so that the picture frame corresponding to said signal reaches the position to be exposed. That is, the distance from head 19 to head 20 corresponds to the distance from the detection point of detector 6 to the position of the aft edge of the picture frame in the position to be exposed, and if film 1 is equal in travel speed to tape 3, they become equal in distance. The film stop device 10 is activated by said signal having been inspected by said head 20, concurrently, the picture frame A is printed at this time when it has been transferred to a position, as shown by brocken lines 4', where is the proper position relative to the exposure device (not shown).

In addition, gate 8 is so controlled that it is open when the signals inspected by the head 16 enter the gate 8 as described above.

The standard for discriminating signals detected by the picture frame edge detecting device varies, but usually picture frames formed on a transparent film substance are surrounded by a black framing in which a picture image is photographed, therefore, a detecting signal of picture frame edges ought to be of a stepped type with one high-to-low or low-to-high level transitions. Therefore, when a signal includes a number of steps or in case of no signal, precautions must be taken against such signals for their possible falsity.

Accordingly, the discriminator 9 stops temporarily such a fore edge detecting signal entered therein and checks the aft edge detecting signal to be substituted therewith, then if it is found to be of a proper stepped type, the recording head 19 records it in the position corresponding to the fore edge detecting signal, as a substitute of the fore edge detecting signal. But if the aft edge detecting signal is absent or has a number of steps, its recording is prevented, thereby determining that the picture frame edge detecting signal is completely faulty.

The second embodiment of the present invention as shown in FIG. 2 provides for recording on one line only of a recording tape, wherein recording head 18 and 19 are disposed on the same line with a reading head 16 in the direction of arrow 2' therefrom, and an erasing head 17 is disposed between the head 16 and the head 18. The distance between the heads 18 and 19 is set to the average value of the picture frame length just as in the first embodiment, thereby they function in the same way as the first embodiment.

Figure 3:
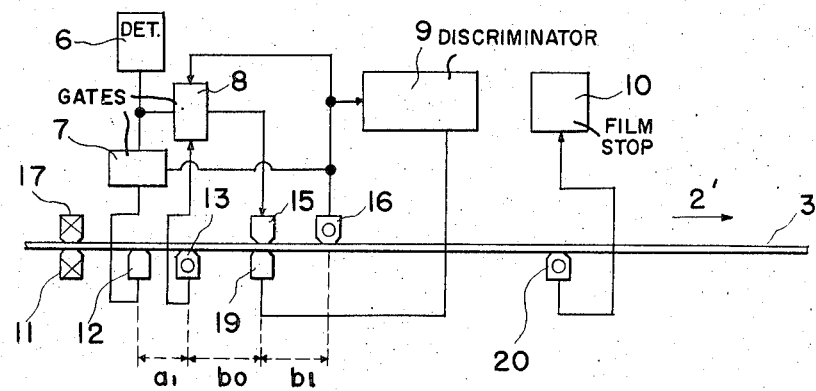
FIG. 3 is a diagram of the third embodiment of the invention.

The third embodiment of the present invention is shown in FIG. 3, wherein recording head 18 of the first embodiment has been omitted, but the relationship between the recording head 12 and reading head 13, and their locations relative to the picture frame edge detecting device 6, and the gates 7, 8 are the same as in the first embodiment. Signals of the fore and aft edges transmitted from the picture frame edge detecting device 6 via the gate 8 are recorded by the recording head 15, independently with the recording by head 12, thereby its distance from reading head 13 to said recording head 15 is equal to the average value $b_0$ of the spacing between picture frames, and the distance of the reading head 16 from said head 15 is equal to the minimum value $b_1$ of the spacing of picture frames.

The record reading signal by the head 16 opens the gates 7, 8, but is simultaneously identified by the discriminator 9.

Now if the discriminator 9 passes the fore edge signal of the recording head 15, the fore edge signal recorded by the head 12 is also passed, thereby it is permitted to pass through to the reading head 20, and actuates the film stop device 10, whereas if the discriminator 9 does not pass the fore edge signal from the head 16, the recorded aft edge signal is transmitted by the discriminator 9 to the head 19 which is in the same position on the other side of the tape 3 as the head 15. Concurrently, the fore edge signal which cannot be discriminated from the correct signal recorded by recording head 12 reaches the position of recording head 19 where the correct signal of the aft edge is recorded by said head 19, which is detected by reading head 20 whose output causes film stopping device 10 to be operated. recording head 20, and activate the film stop device 10.

Figure 4:
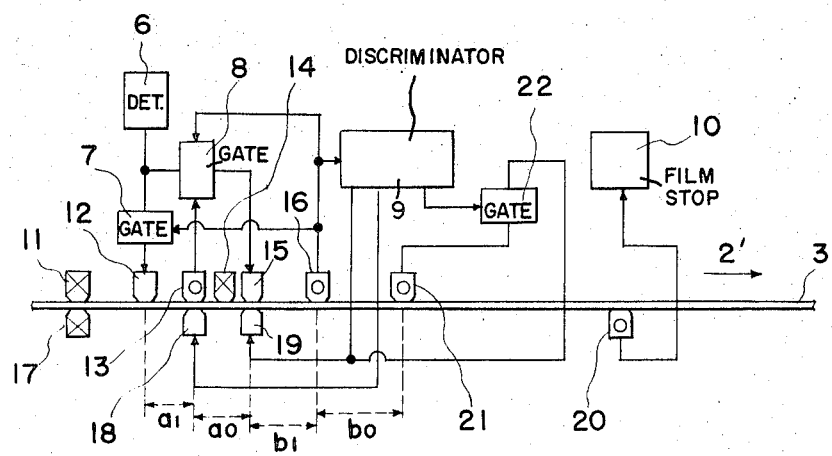
FIG. 4 is a diagram of the fourth embodiment of the invention.

In the aforementioned embodiments, the questionable fore edge signal of a picture frame is substituted by the aft edge signal of the same picture frame, but in the fourth embodiment of this invention as shown in FIG. 4, its recording is substituted by the picture frame edge signal for the next successive picture frame.

This embodiment is also the same as the first embodiment as to the relationship between the recording head 12, the reading head 13, the picture frame edge detecting device 6 and the gates 7, 8.

A head 15 which records on the tape 3 signals of the fore edge and the aft edge transmitted from the picture frame edge detecting device 6 through the gate 8 is disposed apart from the head 13 by a distance of the average value $a_0$ of a picture frame length in the direction of arrow 2', and its distance from the reading head 16 is equal to the minimum distance between picture frames just as the first embodiment.

Another reading head 21 is additionally disposed apart from head 16 in the direction of arrow 2' by the average distance $b_0$ between picture frames, its sensed signal is transmitted to the head 19 via a gate 22, the output of the discriminator 9 is transmitted to the head 18 located in the same position as the head 13, but in another line on the tape 3 concurrently controlling the opening and closing operation of gate 22.

Now when the fore edge signal by the head 16 is passed by the discriminator 9, it is recorded by the head 18, and the discriminator 9, although it accepts the aft edge signal as correct, stops sending it to head 19, whereas if it is not reliable, that signal is stopped by the identifier 9. Further, when the aft edge signal from head 16 is passed by the discriminator 9, its output is recorded by the head 19, taking the aft edge signal as the subsitute of the fore edge signal. However, if the aft edge signal is also not passed by the discriminator 9, the aft edge signal of the output of the discriminator 9 opens gate 22 and the preceding picture frame is inspected by a head 21 and transmitted to the head 19 via the opened gate 22, head 19 recording it as the substitute thereof.

I claim:

1. A system for controlling a mechanism for transporting a film along a given path, said film having a number of picture frames successively disposed on said film in the direction of said path, comprising:

detecting means positioned along the path of said transporting mechanism for generating fore and aft edge signals respectively corresponding to the detection of the first and second transverse edges of a picture frame;

a recording medium driven along a second path in synchronism with said transporting mechanism;

means for stopping said transporting mechanism to position a selected one of said picture frames at an exposure station positioned along said first path downstream from said detecting means;

means for discriminating said fore and aft edge signals to determine true fore and aft edge signals from extraneous signals;

gating means for transferring said fore and aft edge signals between said detecting means and said recording medium and between said recording medium and said means for discriminating; and said means for stopping includes first recording means positioned along said second path responsive to said means for discriminating to record a true fore and/or aft edge signal on said recording medium and further including first sensing means positioned along said second path a fixed distance from said means for recording to sense said recorded signal and actuate said means for stopping.

2. A system as in claim 1 wherein said gating means includes first gate means for transferring fore edge signals of a first picture frame to said recording medium at a first position thereon and second sensing means for sensing said recorded fore edge signals, second gate means for transferring an aft edge signal of a said picture frame to said recording medium at a second position thereon downstream from said first position and including third means for sensing said recorded signals, said second sensing means controlling said second gate means and said third sensing means controlling said first and second gate means for respectively timing said first and second gate means to receive said fore and aft edge signals; and said means for discriminating is responsive to said third sensing means.

3. A system as in claim 2 wherein said first gate means further includes second recording means for recording said fore edge signals at said first position and said second sensing means is spaced downstream from said second recording means a distance not less than the average length between said first and second edges, said second gate means further includes third recording means for recording aft edge signals of said picture frame at said second position and said third sensing means is spaced downstream from said third recording means a distance substantially equal to the distance between like edges of successive picture frames.

4. A system as in claim 2 wherein said means for discriminating has a first mode of operation for transferring a true fore edge signal to said first recording means and blocking said aft edge signal, a second mode of operation for blocking transfer of a false fore edge signal and transferring a true aft edge signal to said first recording means, and a third mode of operation for blocking transfer of both a false fore and false aft edge signal.

5. A system as in claim 4 wherein said means for stopping further includes a fourth recording means responsive to said means for discriminating and positioned upstream of said first recording means by a distance substantially equal to the distance between said first and second edges, and said first recording means records only a true fore edge signal and said fourth recording means records only a true aft edge signal.

6. A system as in claim 5 wherein said recording medium includes two channels, said second and third sensing means and said second and third recording means are associated with one of said channels, said first and fourth recording means and said first sensing means are associated with the other of said channels, and wherein said first gate means further includes first means for erasing the fore edge signals recorded by said second recording means, said first means for erasing is positioned along said second path between said second sensing means and said third recording means.

7. A system as in claim 5 wherein said recording medium includes a single channel, said first gate means further includes a first means for erasing positioned between said second sensing means and said third recording means, said second gating means further includes a second means for erasing positioned along said first channel downstream of said third sensing means, and said first and fourth recording means are positioned along said channel downstream of said second means for erasing.

8. A system as in claim 6 wherein said two channels are parallel to one another along said second path, said second sensing means and said fourth recording means are positioned the same distance downstream from said second recording means, said first recording means and said third recording means are positioned the same distance downstream from said second sensing means and said fourth recording means.

9. A system as in claim 8 wherein said gating means further includes a third gate means and a fourth sensing means, said fourth sensing means is positioned downstream of said third sensing means along said one of said channels a distance substantially equal to the spacing between successive picture frames, said third gate means interconnects said fourth sensing means and said first recording means, whereby in said third mode of operation said means for discriminating opens said third gate and said first recording means records that aft edge signal recorded by said third sensing means and detected by said fourth sensing means.

* * * * *